US006541127B1

(12) United States Patent
Tomikawa et al.

(10) Patent No.: US 6,541,127 B1
(45) Date of Patent: Apr. 1, 2003

(54) SWASH PLATE OF SWASH PLATE TYPE COMPRESSOR

(75) Inventors: Takashi Tomikawa, Aichi (JP); Toyokazu Yamada, Aichi (JP)

(73) Assignee: Taiho Kogyo Co., LTD, Toyota (JP)

( * ) Notice: Subject to any disclaimer, the term of this patent is extended or adjusted under 35 U.S.C. 154(b) by 0 days.

(21) Appl. No.: 09/786,754

(22) PCT Filed: Jul. 7, 2000

(86) PCT No.: PCT/JP00/04532

§ 371 (c)(1), (2), (4) Date: Mar. 9, 2001

(87) PCT Pub. No.: WO01/04492

PCT Pub. Date: Jan. 18, 2001

(30) Foreign Application Priority Data

Jul. 9, 1999 (JP) .......................................... 11-195720

(51) Int. Cl.[7] ............................................... B32B 15/20

(52) U.S. Cl. ....................... 428/652; 428/621; 428/634; 428/639; 428/640; 428/643; 428/644; 428/650; 428/653; 428/654; 428/674; 428/676; 428/698; 428/908.8; 428/937

(58) Field of Search ................................ 428/621, 634, 428/639, 640, 643, 644, 650, 652, 653, 654, 674, 676, 698, 908.8, 937; 427/223, 225

(56) References Cited

U.S. PATENT DOCUMENTS 5,864,745 A 1/1999 Kawagoe et al. ........... 428/553

FOREIGN PATENT DOCUMENTS

| | | |
|---|---|---|
| EP | 0 713 972 | 5/1966 |
| JP | 11-193780 | 7/1999 |
| JP | 2000-179453 | 6/2000 |
| WO | WO95/25224 | 9/1995 |

*Primary Examiner*—Robert R. Koehler
(74) *Attorney, Agent, or Firm*—Armstrong, Westerman & Hattori, LLP

(57) ABSTRACT

In order to improve the wear resistance of the swash plate of a swash-plate type compressor, on which plate copper alloy is flame-sprayed, a composite material, which consists of copper or first copper alloy (for example Cu—Pb alloy) including at least unmelted phase and aluminum or first aluminum alloy (for example Al—Si alloy) including at least melted phase, is flame sprayed on the sliding surface with a shoe.

29 Claims, 3 Drawing Sheets

SWASH PLATE OF SWASH PLATE TYPE COMPRESSOR

TECHNICAL FIELD

The present invention relates to a swash plate of a swash-plate type compressor. The present invention relates to such technical fields as a swash-plate type compressor, the sliding layer having, a composite structure, flame-spraying technique, aluminum-alloy sliding material and copper-alloy sliding material.

BACKGROUND TECHNIQUE

In the swash-plate type compressor, a swash-plate is rigidly secured obliquely to a rotary shaft or is secured obliquely to a rotary shaft in such a manner that its slanting angle is variable. The compression and expansion are carried out by means of rotating the swash-plate, which increases or decreases the volume of a partition space within a compressor, depending upon the rotation of the rotary shaft.

Such swash plate is caused to slide on a sliding member referred to as a shoe, and gas-tight sealing is attained between the both members. The cooling medium can therefore be compressed and expanded in the stated space.

A salient point in the sliding conditions of swash plate is that, during the initial operational period of compressor, the cooling medium reaches the sliding part between the swash plate and the shoe; thus the cooling medium has a rising effect on the lubricating oil which remains on the sliding part, with the result that the sliding condition is in a dry condition free of lubricating oil. The requirements for the sliding condition of the swash plate are therefore very severe.

The sliding properties, which are required for a swash-plate used under the condition described above, are seizure resistance, wear resistance, and like. Proposal have thus been made to add hard materials into the aluminum material for enhancing the wear resistance, to improve the material of the swash plate, and to subject an iron-based swash-plate to heat treatment for enhancing the hardness and hence wear-resistance.

The present applicant proposed in Japanese Unexamined Patent Publication No. SHO 51-36611 to bond sintered Cu material on the shoe in the case of an iron-based swash plate. That is, an iron-based swash plate was heretofore subjected to hardening treatment. However, when the material of the opposed member, i.e., the shoe, is an iron-based material, the sliding takes place between identical kinds of materials thereby incurring a problem that a seizure is liable to occur. Sintered copper alloy is used for the opposing material (shoe) opposed to an iron-based swash plate, so as to avoid the above mentioned problem.

In addition, it was also proposed to apply tin plating on the iron-based swash plate so as to avoid the sliding between identical kinds of materials and hence to enhance the seizure resistance. However, since the Sn plating applied on the iron based swash-plate is soft, there arises a problem of failure in wear resistance. In addition, a hard element added to the aluminum alloy enhances the wear resistance but results in a problem of failure in the seizure resistance.

In addition, it is proposed in European Patent Publication 071397A1 to provide a swash plate of a swash-plate type compressor with a surface layer, which is formed by such a flame-spraying that a part of the layer is not melted. Allegedly, the wear resistance of the flame sprayed copper-alloy is superior to that of the above mentioned conventional swash-plate.

Metal-ceramics composite material has been mainly investigated as metal-based composite material. Production methods are: press forming and then sintering a mixture powder of the copper-alloy and $Al_2O_3$ powder (Japanese Patent No. 2854916); impregnating the ceramic carbon with Al alloy melt (Japanese Patent No. 2846635); and the like.

In the sliding materials, the clad material has a metal-metal composite structure.

The flame-spraying technique is illustrated in Journal of Japan Institute of Metals "Materia Japan" Vol. 33(1994), No.3. p 268–275, entitled "Recent Developments in Flame-Spraying Technique". Production methods of a metal-ceramic based composite material are explained. The flame-spraying techniques are also illustrated in Tribologist Vol. 41 (1996), No. 11, pages 19–24.

Japanese Unexamined Patent Publication No. 9-122955 discloses a sliding bearing of the copper-aluminum alloy composite material referred to in the present invention in which the sliding bearing, a soft layer having hardness comparable to that of white metal, is dispersed in the aluminum-alloy matrix. The method for producing this composite material consists of: a first step of providing a flat sheet consisting of an aluminum-alloy material and having a backing metal; a second step of firmly bonding on the front surface of the flat sheet a soft material, such as Sn, Pb or white metal to 50–100 $\mu$m of thickness; a third step of locally irradiating laser beam on the above-mentioned flat sheet, with the firmly bonded soft metal, thereby dissolving the soft metal into the interior of the aluminum alloy; and a fourth step of bending the flat sheet to a semi-circular form; and, a fifth step of machine, finishing the laser-flame sprayed surface and then polishing the soft material, thereby exposing, in the polished part, the complex layer of the aluminum-alloy and the soft-alloy layer.

Among the copper alloys, the frequently used sliding alloy is a Cu—Pb based alloy, in which the added Pb improves the adhesion resistance and the seizure resistance. Since the wear resistance of copper alloy is poor, it is known to add a hard matter such as $Fe_2P$ into the copper alloy and to sinter it, as is proposed in U.S. Pat. No. 5,326,384 assigned to the present applicant. The conformability is, however, inevitably impaired by the addition of such hard matter.

The flame-spraying technique proposed in European patent publication 0713972A1 enables a part of the Cu—Pb alloy structure, particularly the Pb structure, to remain unmelted and hence the Pb phase is not coarsened. The wear resistance can thus be enhanced. However, since the wear resistance of the flame sprayed Cu—Pb alloy surface-layer is not satisfactory, so that the swash plate is locally worn. There arises occasionally such problems as lowering of air-conditioning capacity, generation of abnormal sound, abnormal vibration and the like.

However, it is difficult to harden the flame-sprayed copper alloy and hence to improve the wear resistance. That is, the hardening of copper alloy is broadly carried out usually by means of precipitation-hardening in the case of wrought alloy, such as rolled or drawn alloys. Since the flame-sprayed alloy is basically a cast alloy, the hardening relying on modification of the composition is difficult.

DISCLOSURE OF INVENTION

It is, therefore, an object of the present invention to improve wear resistance of a flame-sprayed copper-alloy, layer of a swash-plate type compressor.

The present invention provides a swash plate of a swash-plate type compressor, characterized in that a flame-sprayed surface layer, which comprises copper or a first copper-alloy having at least unmelted phase, and aluminum or a first aluminum alloy having at least melted phase are formed on at least a surface of the swash plate in sliding contact with a shoe.

The copper or copper alloy (collectively referred to as "the copper alloy" in this paragraph) and aluminum or aluminum alloy (collectively referred to as "the aluminum alloy" in this paragraph) are rendered to the sliding layer of a swash plate having a composite structure. For this purpose, a part of these alloys should be melted and play a role of binder. From another point of view, for example, Pb of a Cu—Pb alloy and Si of an Al—Si alloy impair the properties of the matrix of the other alloy, so that no useful composite structure is obtained. The complete melting of the copper alloy and aluminum alloy should, thus, be prevented.

In the present invention, the binder effect for forming the composite material can be realized when at least the aluminum-alloy is melted. Copper and aluminum inherently exhibit good compatibility and are appropriate for bonding.

Examples of copper alloy and aluminum alloy are mainly described hereinafter.

EMBODIMENTS OF INVENTION

(A) Flame-Sprayed Composite Material

The present invention is described with reference to an embodiment in which copper alloy and aluminum alloy are rendered to a composite material, of which the flame-sprayed layer consists. A flame-spraying method can obtain this composite material. The general tendency of the flame spraying involves (a) and (b): (a) In a case where the copper-alloy powder and the aluminum-alloy powder have equal particle-diameters, the aluminum alloy powder melts. (b) In a case where the average particle-diameter of the aluminum-alloy powder is much considerably larger than that of the copper-alloy powder, the latter in addition to the former melts. By utilizing such tendencies, at least a part of the aluminum-alloy powder melts, while the solid properties of the balance of the powder can be essentially maintained in the copper-aluminum composite material thus produced.

Since the aluminum alloy exhibits superior wear resistance to that of the copper alloy, and further there are a number of cast aluminum alloys having excellent wear resistance, when this alloy is not entirely alloyed with but is rendered composite with the copper alloy, the, wear resistance of the entire composite material can be enhanced more than that of the copper alloy.

Considering these points, the weight proportion of the copper alloy is preferably from 75 to 30%, and the balance is the aluminum alloy. The "melted phase" in the present invention is the melted phase during the flame spraying of the copper-aluminum composite material. That is, although almost all of the metallic materials undergo the melting in the preceding production process, the melted phase indicates the melting and solidified state specifically during the flame-spraying.

(B) General Explanation of Copper Alloy and Aluminum Alloy

The copper and aluminum alloys in the present invention include all alloys capable of flame-spraying.

However, the following matters should preferably be considered.

The temper state of metal is roughly classified into the casting state and wrought state, such as rolling and drawing. Since the flame-sprayed alloy belongs to the former casting state, casting copper alloys such as bronze, lead bronze and phosphorous bronze are the preferable subject matters of the present invention. Meanwhile, as the wrought copper products used in electronic appliances are wrought alloys, they can be flame-sprayed but cannot demonstrate their inherent properties. Likewise, wrought aluminum alloys are excluded, and cast alloys such as Al—Si based casting alloys having excellent wear resistance are the preferable subject matters of the present invention.

In addition, the present first copper alloy and the first aluminum alloy include the second copper alloy and aluminum alloy, in which a component of the other alloy is partially incorporated and melted together by flame spraying. The completely melted copper and aluminum alloys are excluded from the composite material of the present invention. Nevertheless, they may be partially melted together, preferably 90% by area or less. The composite material according to such embodiment consists of the flame-sprayed copper-alloy, the flame-sprayed aluminum-alloy and the copper-aluminum alloy formed by flame spraying. In the description hereinbelow, the copper alloy and the aluminum alloy indicate those free of the second copper alloy and the second aluminum alloy, respectively, unless otherwise specified.

(C) Copper Alloy

In the present invention, the copper alloy can contain, by weight percentage, 0.5% or more, preferably 1% or more and 50% or less of one or more selected from the group consisting of 40% or less of Pb, 30% or less of Sn, 0.5% or less of P, 15% or less of Al, 10% or less of Ag, 5% or less of Mn, 5% or less of Cr, 20% or less of Ni and 30% or less of Zn.

Lead is the most preferable element which enhances the sliding properties under dry condition. However, when the lead content exceeds 40%, the strength of copper alloy is lowered. The upper limit of lead should, therefore, be 40%. A preferable lead content is 30% or less, more preferably from 1 to 15%

The elements other than lead are mainly solid-dissolved in copper and enhance its wear resistance and seizure resistance. Among them, Ag outstandingly enhances the sliding properties under minimal lubricating-oil conditions. Regarding the addition amount, 10% or more of Sn and 1% or more of Mn precipitate and the resultant precipitates enhance the wear resistance. Thermal conductivity and good sliding properties with respect to the opposite aluminum or iron-based material, particularly wear resistance and seizure resistance, which are inherent to copper, are lost at Sn exceeding 30%, P exceeding 0.5%, Ag exceeding 15%, Mn exceeding 5%, Cr exceeding 5%, Ni exceeding 20%, and Zn exceeding 30%.

These elements should, therefore, not exceed the above mentioned upper limits. Preferable contents areas follows: Sn: 0.1–20%, P: 0.2–0.5% or less, Ag: 0.1–8%, Mn: 0.5–4%, Cr: 0.5–3%, Ni: 0.5–15%, and Zn: 5–25%, More preferable contents are as follows: Sn: 0.1–15%, Ag: 0.2–5%, Mn 0.5–3%, Cr: 1–2%, Ni: 1–10%, and Zn: 10–20%. The total amount of the additive elements should be in a range of from 0.5 to 50% because of the above-described reasons.

The first copper alloy containing these additive elements (excluding the second copper alloy) consists of Cu crystals, in which these elements are solid-dissolved (i.e., the Cu solid-solution), or Cu crystals (including the Cu solid-solution) and other phases. The other phases are a crystallized phase, a precipitated phase, a decomposed phase or the like. These phases are a metal, an intermetallic compound, or other compounds such as $Cu_3P$. That is, if the first copper alloy (excluding the second copper alloy) consists only of these compounds or the like, the inherent sliding properties of copper are not realized. It is, therefore, preferable that the Cu crystals are an essential component of the present invention. However, the second copper alloy may consist only of non-metallic compounds or the like.

(D) Aluminum Alloy

Aluminum alloy, which contains from 12 to 60% by weight of Si, can be used in the present invention.

When the Si content is less than 12%, Si is slightly effective for enhancing the wear resistance and the seizure resistance. When the Si content exceeds 60%, the strength is seriously lowered so that decrease in wear resistance is incurred. A preferable Si content is from 15 to 50%. When the size of Si particles exceeds 50 μm, the Si particles are liable to be separated. A preferable size is from 1 to 40 μm.

Next, the Al—Si—Sn based alloy has excellent wear resistance and seizure resistance in the wear-resistant and seizure-resistant parts, such as the metal and bush. Al—Sn alloys have been conventionally used for such parts. Sn is a component which imparts lubricating property and compatibility. Sn is uniformly dispersed in the aluminum matrix. Sn preferentially adheres on the opposite shaft and thus prevents the sliding of the same kind of material, i.e., Al adhered on the opposite shaft and Al of the bearing. The seizure resistance is, thus, enhanced. When the Sn content is less than 0.1%, Sn is slightly effective for enhancing the lubricating property. When the Sn content exceeds 30%, the strength of the alloy is lowered. A preferable Sn content is from 5 to 25%.

The aluminum alloy can contain the following optional elements.

Cu: Cu is solid-dissolved in the aluminum matrix in super saturation and enhances its strength. The wear due to adhesion wear of Al and separation of Si particles can, thus, be suppressed. In addition, Cu and a part of Sn form an Sn—Cu intermetallic compound, and hence the wear resistance is enhanced. However, when the Cu content exceeds 7.0%, the alloy is excessively hardened to provide appropriate sliding material. A preferable Cu content is from 0.5 to 5%.

Mg: Mg is combined with apart of Si to form Mg-Si intermetallic compounds and hence the wear resistance is enhanced. However, when the Mg content exceeds 5.0%, a coarse Mg phase is formed which impairs the sliding properties.

Mn: Mn is solid-dissolved in the aluminum matrix in super saturation and enhances its strength. Similar effects to those of Cu, are realized. However, when the Mn content exceeds 1.5%, the alloy is excessively hardened to provide appropriate sliding material. A preferable Mn content is from 0.1 to 1%.

Fe: Fe is solid-dissolved in the aluminum matrix in super saturation and enhances its strength. Similar effects to those of Cu, are realized. However, when the Fe content exceeds 1.5%, the alloy is excessively hardened to provide appropriate sliding material. A preferable Fe content is 1% or less.

Cr: Cr realizes an effect to prevent the coarsening of a soft phase, such as Sn. However, when the Cr content exceeds 5%, the alloy is excessively hardened to provide appropriate sliding material. A preferable Cr content is from 0.1 to 3%.

Ni: Ni is solid-dissolved in the aluminum matrix in super saturation and enhances its strength. Similar effects to those of Cu are realized. However, when the Ni content exceeds 8%, the alloy is excessively hardened to provide appropriate sliding material. A preferable Ni content is from 5% or less.

The first aluminum alloy containing these additive elements (excluding the second aluminum alloy) consists of Al crystals in which these elements are solid-dissolved (i.e., the Al solid-solution), or Al crystals (including the Al solid-solution) and other phases. The other phases are a crystallized phase, a precipitated phase, a decomposed phase or the like. These phases are a metal, an intermetallic compound, or other compounds. That is, if the first aluminum alloy (excluding the second aluminum alloy) consists only of these compounds or the like, the binder effect of the aluminum alloy is not realized. It is, therefore, preferable that only the Al crystals are an essential component of the present invention. However, the second aluminum alloy may consist only of chemical compounds or the like.

(E) Entire Composition of Composite Material

Combination of Cu—Pb based Alloy and Al—Si based Alloy

A preferable combination of the components according to the present invention is that of a Pb-containing copper alloy having excellent seizure resistance and an Si-containing aluminum alloy having excellent wear resistance. More specifically, the copper alloy containing 40% or less of Pb and the 12–60% Si—Al alloy, by weight percentage, are combined. The entire composition of this composite material is preferably Cu: 8–82%, Al: 5–50%, Pb: 32% or less, and Si: 5–50%, by weight percentages.

Combination of Cu—Pb based Alloy and Al—Si—Sn based Alloy

The entire composition of this composite material is preferably Cu: 8–82%, Al: 5–50%, Pb: 32% or less, Si: 5–50% and Sn: 21% or less by weight percentage.

Combination of Cu—Pb based Alloy and Al—Si—X base Alloy

In this combination, the aluminum alloy contains the X component (Cu, Mg, Mn, Fe, Cr and/or Ni). The entire composition of this copper-aluminum composite material is, preferably, Cu: 8–50%, Al: 15–50%, Pb: 32% or less, Si: 5–50%, Mn: 1.2% or less, Cr: 5% or less, Ni: 4% or less, Mg: 4.0% or less and Fe: 1.2% or less, by weight percentage. In a case where Sn is contained in addition to the X component, the Sn content is preferable 24% or less.

Combination of Cu—Pb—X based Alloy and Al—Si based Alloy

In this combination, the copper alloy contains the X component (Sn, P, Al, Ag, Mn, Cr, Ni and/or Zn). The entire composition of the composite material is, preferably, Cu: 8–82%, Al: 5–50%, Pb: 32% or less, Si: 5–50%, Sn: 24% or less, P: 0.4% or less, Ag: 8% or less, Mn: 4% or less, Cr: 4% or less, Ni: 16% or less, and Zn: 24% or less, by weight percentage.

Combination of Cu—Pb—X based Alloy and Al—Si—Sn based Alloy

The entire composition of their composite material is, preferably, Cu: 8–50%, Al: 15–50%, Pb: 32% or less, Si: 5–50%, Sn: 30% or less, P: 0.4% or less, Ag: 8% or less, Mn: 4% or less, Cr: 4% or less, Ni: 16% or less, and Zn: 24% or less, by weight percentage.

Combination of Cu—Pb—X based Alloy and Al—Si—X based Alloy

The entire composition of their composite material is, preferably, Cu: 8–50%, Al: 15–50%, Pb: 32% or less, Si: 5–50%, Sn: 24% or less, P: 0.4% or less, Ag: 8% or less, Mn: 5% or less, Cr: 8% or less, Ni: 20% or less, and Zn: 24% or less, Mg: 4.0% or less, and Fe: 1% or less, by weight percentage. In a case where Sn is contained in addition to the X component, the Sn content is preferable 30% or less.

(F) Flame-Sprayed Metal Structure

Prior to describing the structure of the copper-aluminum composite material, the general characteristics of the flame-sprayed layer are described. This structure is that of the melted and solidified atomized powder and the like. According to one morphology, the droplets, which have been melted and hence formed in the flame of flame-spraying, are impinged upon the surface of the swash plate and then deformed. As seen in the cross section of the layer, portions in laminar form, flaky form or in a flat plate are laminated on one another. As seen in the flat plane, small discs, fish scales, and the like are laminated on one another. According to another morphology, when the atomized powder is forcedly supplied under pressure of gas into the flame, the atomized powder maintains the form of isolated particles, the particles being scattered. The atomized powder seems be melted as is, although a part of the particles may be incorporated with one another. Molten droplets impinge upon the swash plate and solidify. When the thickness of the flame-sprayed layer is decreased to accelerate the cooling speed, one droplet or a few droplets are not incorporated with the other droplets but solidify as independent particles. The droplets, which are relatively small, collapse and are laminated on one another in the form of numerous fine laminar pieces, as described above. According to a further morphology, the droplets are incorporated with one another and, as a whole, form the flame-sprayed layer.

(G) Flame-Sprayed Composite Structure

In the present invention, the copper-alloy powder, which is not melted at least during the flame spraying, is contained in the flame-sprayed layer. A mixed structure of the aluminum-alloy melted phase and the unmelted phase of copper-alloy powder, is formed. The constituent unmelted phase is the copper-alloy powder, which does not disappear in the spray flame but remains in the flame-sprayed layer. The melted phase has, therefore, an ordinary flame-sprayed structure having the morphology as described in the preceding item (F), that is, this structure is melted during the flame-spraying. The unmelted structure is not melted during the flame-spraying. A part of the morphologies as described in the preceding item (F) is deficient in the unmelted structure, as exemplified below. Alternatively, the unmelted structure is distinguished from the melted structure, for example, in the following points.

① The melted phase incorporates with one another and is molten. No incorporation of the unmelted phase occurs.

② The melted phase greatly deforms due to collision. Deformation of the unmelted phase due to collision is slight.

③ In the case of Cu—Pb alloy or the like, the melted phase and the unmelted phase can be distinguished from one another when Pb, which is a constituent of the minority phase, is observed.

④ Distinctive judgment by the above described ①-③ may be difficult with regard to the Al alloy phase of the flame-sprayed layer, because such phase has a similar morphology pattern. In this case, when grain boundaries are impossible to detect and the phases appear at a glance to be continuous, and, further, the minority phases have a uniform morphology, judgement of the melted phase can be made.

⑤ When the particles in the Al alloy phases of the flame-sprayed layer have identical morphology, the particles are compared with atomized powder, crushed powder, electrolytic powder and the like having known morphology. When the particles correspond to these powders, it can be judged that the particles are the ummelted structure.

⑥ Portions of copper-alloy powder and aluminum alloy powder are melted together, and then a copper-based minority phase is dispersed in the aluminum matrix. This minority phase is the second aluminum alloy referred to in the present invention and can be simply distinguished from the other phases.

⑦ The aluminum alloy is incorporated in the partially melted copper-alloy powder, and then the Al-based minority phase is separated from it and is dispersed in the copper matrix. This structure is the melted phase of the second copper alloy. In addition, in a case where the incorporated aluminum remains in the solid-solution state, the incorporated aluminum is the melted phase of the second copper alloy. The melted structure is easily distinguished from the unmelted structure of copper, which may be present in the copper alloy.

In the present invention, the weight proportion of copper alloy is preferably from 75 to 30% and the balance is aluminum alloy.

The main structure of the copper-aluminum composite material of the present invention is a combination of two or more of (a) copper-alloy melted structure, (b) copper-alloy unmelted structure, (c) aluminum-alloy melted structure, and (d) aluminum-alloy unmelted structure (except for the combination of only (a) and (c) and the combination of only (b) and (d)).

In the present invention, a portion of the powder does not melt during the flame spraying and remains in the flame-sprayed layer. A mixture of a melted structure and an unmelted structure of powder is thus formed. This feature is first described with reference to the Cu—Pb based alloy and subsequently with reference to the Al—Si based alloy.

The quenched structure of the lead-bronze powder does not disappear even in the spraying flame but remains in the flame-sprayed layer and thus becomes a constituent-phase, copper-bronze powder unmelted structure of the above-mentioned structure. In this structure, the phase mainly composed of lead, is dispersed in fine particulate form. Alternatively, a laminar phase mainly composed of lead distributes in the copper boundaries. This structure is a kind of cast structure but has the features: (a) the main cooling direction is from periphery toward the inner side of the particles; and, (b) the structure is more quenched than that of the ordinary ingot casting or continuous casting.

In the present invention, when the copper alloy and the aluminum alloy are completely melted together, for example, Si of the aluminum alloy and Cu melt and then solidify. Coarse intermetallic compounds are formed upon the solidification and a practically non-usable Cu—Al—Pb—Si alloy is thus produced. The combination consisting of only (a) and (c) mentioned above is, therefore, excluded. More specifically, when the unmelted powder is not co-present under the condition that the copper-alloy melted structure (a) and the aluminum-alloy melted structure (c) are formed, the melted copper alloy and the melted aluminum alloy are almost completely melted together. It is, therefore, necessary to avoid the flame-spraying condition where only the structures (a) and (c) are present. When the structures (b) and/or (d) are present in addition to the structures (a) and (c), it is possible to prevent the copper/aluminum alloys from melting together.

In addition, both the copper alloy and aluminum alloy form a low-melting-point-material in the boundaries between the copper-alloy unmelted structure (a) and the aluminum-alloy melted structure or between the aluminum-alloy melted structure (c) and the copper-alloy melted structure (b). As a result, both alloys may be melted together but only to a slight degree. Therefore, such boundary structure are not included in the main structure of the present invention. The main structure of the molten powder is classified into (a), (b), (c) and (d).

From the above descriptions, the combinations of the structure of the copper-aluminum composite material according to the present invention are:

A. (a)+(d)

B. (a)+(b)+(d)

C. (b)+(c)

D. (b)+(c)+(d)

E. (a)+(b)+(c)

F. (a)+(b)+(c)+(d)

G. (a)+(c)+(d)

In the composite materials (B, C, D, E, F) having the unmelted Cu-alloy structure, the fine Pb phase in the atomized powder remains in the flame-sprayed layer and contributes to the enhancement of sliding properties. In the melted Cu—Pb alloy powder (A, B, E, F. G), Cu and Pb melt and then solidify. During the melting and solidification, the Pb phase coarsens, and a reaction between the melted Cu and the Al—Si alloy powder takes place. Due to this reaction, the composite material having the Al—Si alloy structure is bonded. In most cases, the surface of the last-mentioned powder is melted during the surface reaction (F, G). In the composite materials (C, D, E, F, G) having the melted Al-alloy structure, the dispersed Si particles are nodular, that is, they have almost the same size in any direction, such as spheroidal, granular, polygonal shape or an indefinite shape classified in none of the former shapes. In these composite materials, no such particle shape having a long directional property in one direction is found, that is, neither the primary Si of the conventional melted alloy nor the Si particles of the rolled alloy are found. Although the primary Si and the eutectic Si are clearly distinguished from one another in the conventional melted alloy, such distinction is difficult in the case of the present invention. In addition, a reaction between the melted Al—Si alloy powder and the Cu—Pb alloy powder takes place, and hence the bonding of the latter powder takes place.

(H) Properties of Flame-Sprayed Surface Layer

The respective constituent alloy phases of the copper-aluminum composite materials having those structures are described with regard to their properties. The description is made with reference to an example of Cu—Pb alloy and Al—Si alloy.

(a) With regard to the unmelted copper alloy, the fine Pb phase of the copper-alloy powder such as atomized powder remains in the flame-sprayed layer, and contributes to enhancement of the sliding properties. When such components as Al and Si of the (molten or not,molten) aluminum alloy, is dissolved in the copper alloy, an inherent property of copper, i.e., the adhesion difficulty, may be weakened. The unmelted copper alloy can impede weakening of the adhesion difficulty.

(b) The Pb phase coarsens during the melting and solidification of the melted Cu—Pb alloy. The Al—Si alloy powder particles are bonded by a reaction between it and the melted Cu, Pb. In most cases, the surface of this powder is melted during the reaction.

(c) Nodular, Si dispersed in the melted Al-alloy structure has almost the same size in any direction, such as spheroidal, granular, polygonal shape or has an indefinite shape classified in none of the former shapes. In these composite materials, no such particle shape having a long directional property in one direction is found, that is, neither the primary Si of the conventional melted alloy nor the Si particles of the rolled alloy are found. Although the primary Si and the eutectic Si are clearly distinguished from one another in the conventional melted alloy, such distinction is difficult in the case of the present invention. Because of such Si structure, the wear resistance is greatly enhanced. In addition, a reaction between the melted Al—Si alloy powder and the solid Cu—Pb alloy powder takes place, and hence the bonding of the latter powder takes place.

Hardness of the composite is generally intermediate between that of the hard and soft materials. However, in the composite material according to the present invention, its hardness is higher than the average value of the hard material and soft material, because a reaction phase of the copper alloy and the aluminum alloy may be formed.

(I) Flame-Spraying Method

Methods for forming the composite sliding layer by flame spraying are specifically described. In the present invention, various flame-spraying methods listed in Tribologist, ibid, page 20, FIG. 2, can be employed. Among them, the high velocity oxyfuel flame spraying (HVOF) method can be preferably employed. This method has a feature that "... this method is a high velocity oxyfuel flame-spraying method (HVOF, High Velocity Oxyfuel). In this method, the combustion is carried out in the gun interior (combustion chamber). Both the oxygen (0.4–0.6 MPa) and fuel gas (0.4–0.6 MPa) are of high pressure. The velocity of gas jet is very rapid. Its particle velocity amounts to the explosion flame-spraying. Various flame-spraying methods belonging to the series of HVOF have been developed, such as diamond jet, top gun, continuous explosion system and the like" (Tribologist. ibid, page 20, right column, lines 4 through 13). It seems that because of such features of HVOF the prominent Si and Sn particle morphology is obtained. Since the flame sprayed Al is hardened by rapid cooling and solidification, its feature is the high holding force of Si particles. As a result, the wear due to separation of Si particles can be suppressed.

Atomized powder, such as Cu—Pb alloy, Al—Si alloy, Al—Si—Sn alloy powder and the like can be used as the flame-spraying powder.

Flame-spraying condition is preferably 0.45–1.10 MPa of oxygen pressure, 0.45–0.76 MPa of fuel pressure, and from 50 to 250 mm of the flame-spraying distance. Thickness of the flame-sprayed layer is preferably from 10 to 500 $\mu$m.

Subsequently, methods for producing various composite materials A through G mentioned above are illustrated with reference to a method for adjusting the average particle-diameter of the powder. Table 1 shows a mixing example of the copper-alloy powder having the particle size of a regular distribution around one average value and the aluminum-alloy powder having the same distribution. Table 2 shows a mixing example, in which either or both of the copper alloy and the aluminum alloy is a mixture of coarse and fine particles having a regular distribution of particle size.

TABLE 1

| Composite Material | Cu-Pb Alloy Powder ($\mu$m) | Al-Si Alloy Powder ($\mu$m) |
|---|---|---|
| A | 30 | 150 |
| C | 50 | 100 |
| D | 75 | 50 |

TABLE 2

| Composite Material | Cu-Pb Alloy Powder (μm) | | Al-Si Alloy Powder (μm) | |
|---|---|---|---|---|
| | Coarse Particles | Fine Powder | Coarse Particles | Fine Powder |
| B | 75 | 30 | 150 | — |
| E | 75 | 30 | — | 50 |
| F | 75 | 30 | 150 | 50 |
| G | — | 30 | 150 | 50 |

When the combination of fine Cu—Pb powder and coarse Al—Si powder in Table 2 is selected, it is possible to increase the melting amount of the copper alloy.

(J) Other Embodiments of Invention

Various metallic substrates such as iron, copper and aluminum substrates can be used as the substrate on which the flame-sprayed layer is formed. The shape of the substrate is optional such as a sheet, a disc, a tube and the like. Preferably, the surface of the substrate is roughened by means of shot-blasting and the like, to Rz 10 to 60 μm of surface roughness. Then the adhesion strength of a film is enhanced.

The flame-sprayed layer may be subjected to heat treatment to adjust the hardness. Apart of the structure may be melted at the heat treatment.

One or more compounds selected from the group consisting of $Al_2O_3$, $SiO_2$, SiC, $ZrO_2$, $Si_3N_4$, BN, AlN, TiN, TiC, $B_4C$, as well as iron-phosphorus compounds, iron-phosphorus compounds, iron-boron compounds, and iron-nitrogen compounds can be added, as a component for enhancing the wear-resistance, into the above-mentioned copper-aluminum composite material, in weight percentage of 30% or less, preferably 10% or less, more preferably 1 to 10%. When the addition amount of these components exceeds 30%, the lubricating property and compatibility are impaired, with the result that seizure is liable to occur.

In addition, the entire composite material can contain 30% or less of graphite in weight percentage in the present invention. Graphite is an additive which enhances the lubricating property and hence prevents cracking of the sliding layer. When the graphite content exceed's 30%, the strength of the flame-sprayed layer is disadvantageously lowered. A preferable graphite content is from 1.5 to 15%.

Furthermore, bronze, which contains 3% by weight percentage or less of graphite, can be flame-sprayed in the present invention. Graphite is an additive, which enhances the lubricating property and hence prevents cracking of the sliding layer of a swash plate, When the graphite content exceeds 3%, the strength of the flame-sprayed layer is disadvantageously lowered. Preferable graphite content is from 0.15 to 1.5%.

In the present invention, an intermediate layer, which consists of one or more materials selected from the group consisting of copper, nickel, aluminum, copper-nickel based alloy, nickel-aluminum based alloy, copper-aluminum based alloy, copper-tin based alloy, self-fluxing nickel alloy and self-fluxing cobalt alloy, may be formed between the flame-sprayed layer and the substrate so as to enhance the adhesion strength of the flame-sprayed layer. Plating, sputtering, flame-spraying and the like can form this intermediate layer. Any one of these materials is easily alloyed with the bronze, provided that the surface of these materials is rough. The intermediate layer is firmly bonded with the (un)melted layer during the flame spraying and enhances the bonding strength of the flame-sprayed layer and the backing metal. A preferable thickness of the intermediate layer is from 5 to 100 μm. Cu—Sn—P based alloy can be used as the copper-tin based alloy. Since Cu—Sn—P based alloy has good flowability and is difficult to be oxidized, the intermediate layer formed by spraying this alloy can attain improved properties.

The above-described flame-sprayed layer can be coated with a soft metal layer, such as plating of Pb, Pb alloy, Sn or Sn alloy. Then, these materials are rapidly worn to form a good compatible surface and make the subsequent wear difficult to occur. The soft metallic layer is, for example, a plating layer mainly consisting of Pb and Sn.

In addition, the above-described flame-sprayed layer may be coated with a coating, which contains $MoS_2$ or graphite or a mixture of $MoS_2$ and graphite, bonded by a resin binder. A preferable thickness of the coating layer is from 1 to 50 μm.

The above descriptions (A) through (I) are applied to the pure-aluminum (non-alloy) and pure-copper (non-alloy) composite material, except for the descriptions of the additive elements such as Si, Pb.

Figure 1:
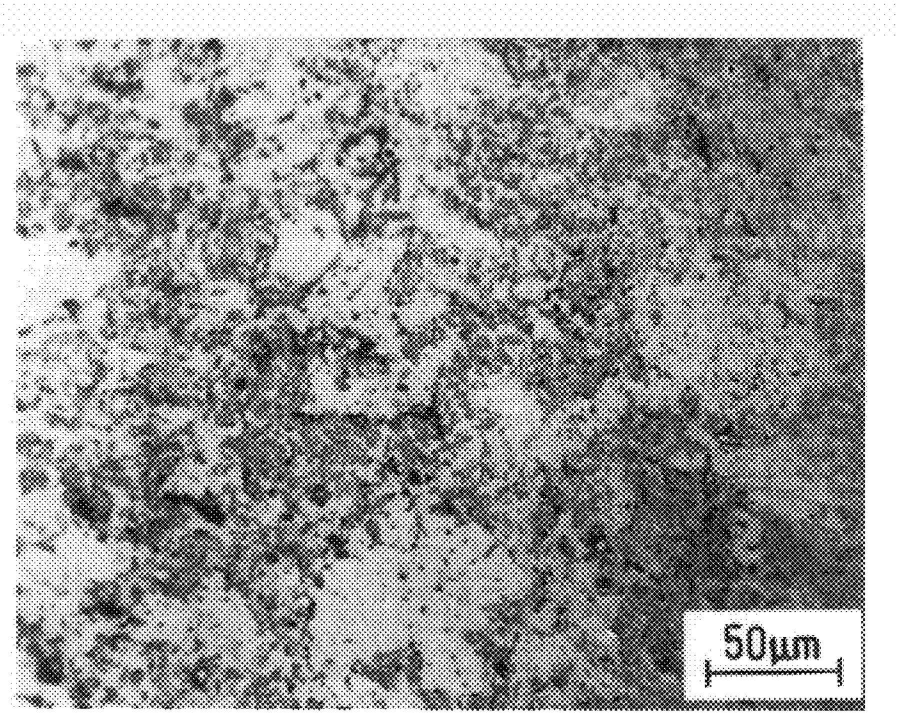
FIG. 1 is a microscopic photograph of the flame-sprayed composite material in the inventive Example 3, depicting, showing its surface structure without etching.

The method of the present invention is described more in detail with reference to the examples

BEST MODE FOR CARRYING OUT INVENTION

Example 1

60 weight % of a Cu-10 weight % of Pb-10 weight % of Sn alloy atomized powder (30 μm of average particle diameter) and 40 weight % of aluminum-alloy atomized powder (atomized powder of A2024 aluminum alloy, to which 40 weight % of Si is added, 10 μm of average particle diameter) were mixed. A commercially available pure-aluminum rolled sheet was subjected to shot blasting using steel grids (0.7 mm of size) so as to roughen the surface of a substrate to Rz 45 μm. Flame spraying was carried out on the roughened substrate to a thickness of 250 μm. An HVOF type flame-spraying machine (DJ. product of Sulzer Meteco) was used for the flame spraying. The flame spraying was carried out under the following conditions.

Oxygen Pressure: 1.03 MPa, 150 psi

Fuel Pressure: 0.69 MPa, 100 psi

Flame-Spraying Distance: 180 mm

Flame-Spraying Thickness: 250 μm

Hardness of the flame-sprayed layer was Hv 260–300. In addition, the entire composition was 36% of Cu, 31% of Al, 3% of Pb, 22% of Si, 4% of Sn, by weight percentage, the balance being impurities.

The flame-sprayed alloys of Example 1 and Comparative Example 1 were subjected to the wear resistance test by the following method.

Test Method of Wear Resistance

A steel ball (SUJ 2) having 8 mm of diameter was pressed on the flame-sprayed layer of samples under 1 kgf of load and was caused to slide at 0.5 mm/second of speed, under the dry condition.

The results of the test are shown in Table 3.

Example 2

The same flame-spraying as in Example 1 was repeated except that the atomized copper-alloy powder of Example 1 was replaced with a Cu-24 weight % of Pb-4 weight % of Sn alloy atomized powder. The same wear test as in Example 1 was carried out. The results are shown in Table 3. Hardness of the flame-sprayed layer was Hv 220–280. In addition, the entire composition was 36% of Cu, 32% of Al, 7% of Pb, 23% of Si, and 2% of Sn.

Example 3

Figure 2:
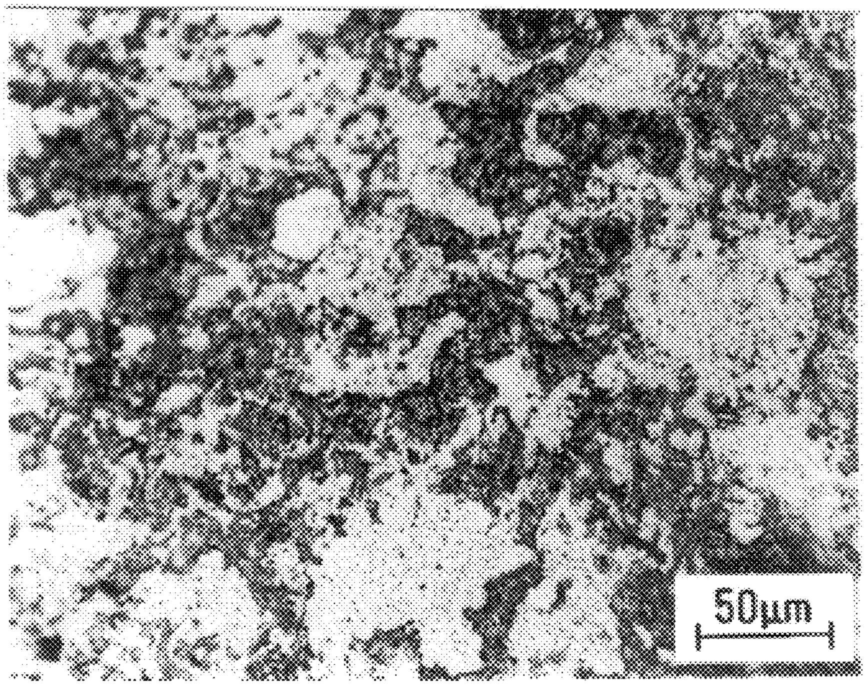
FIG. 2 is a microscopic photograph of the flame-sprayed composite material in the inventive Example 3, depicting its etched surface structure.
Figure 3:
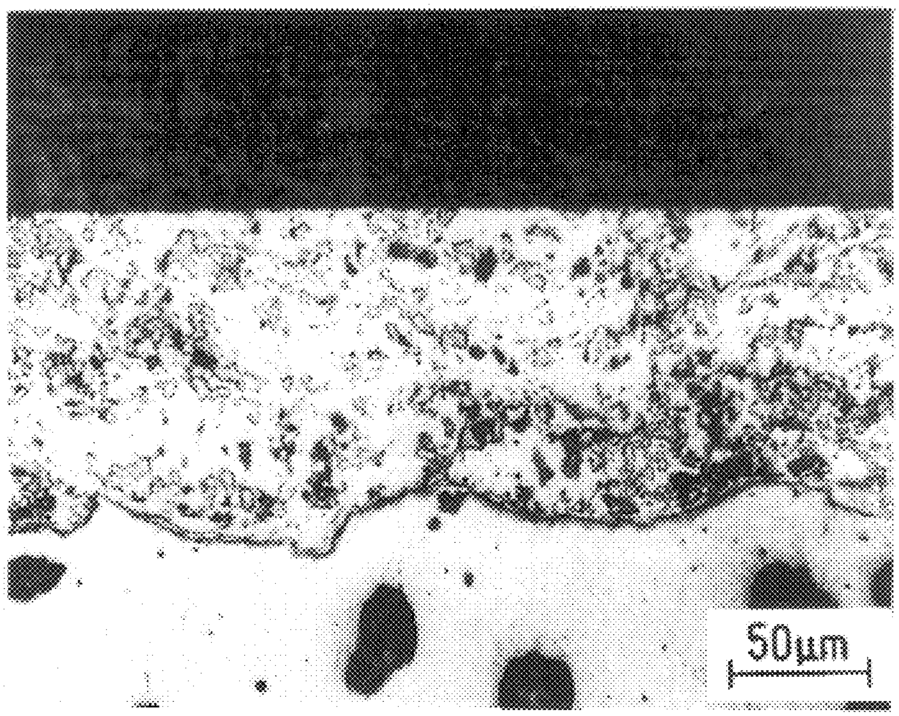
FIG. 3 is a microscopic photograph of the flame-sprayed composite material in the inventive Example 3, depicting its cross sectional structure without etching.
Figure 4:
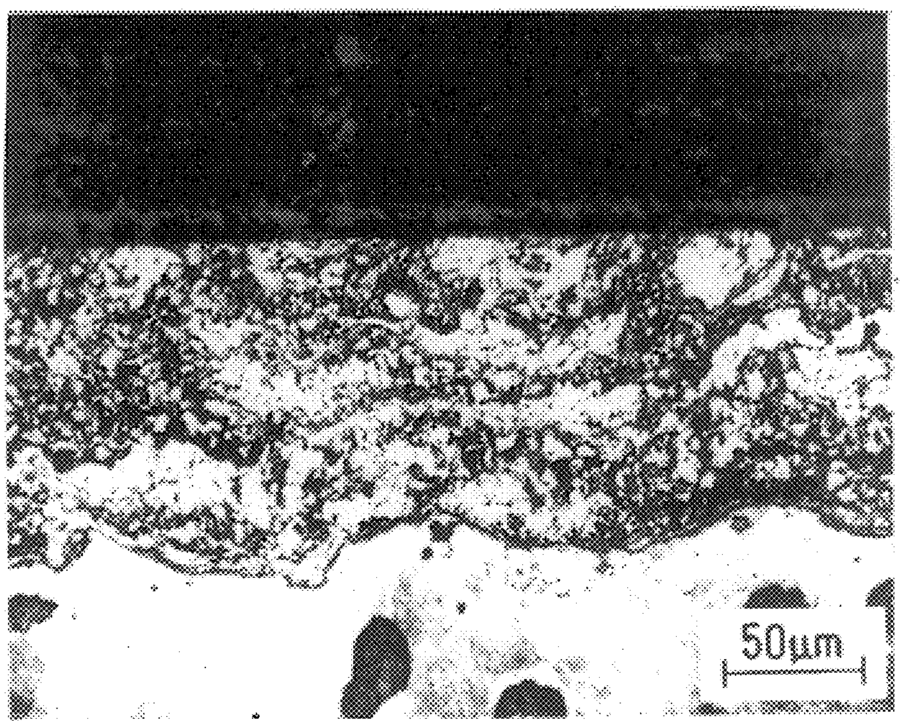
FIG. 4 is a microscopic photograph of the flame-sprayed composite material in the inventive Example 3, depicting its etched cross-sectional structure.

75% by weight of a Cu-10 weight % of Pb-4 weight % of Sn alloy atomized powder (60 μm of average particle-diameter) and 25% by weight of aluminum-alloy atomized powder (atomized powder of A2024 aluminum alloy, to which 40 weight % of Si was added, 100 μm of average particle diameter) were mixed. A commercially available pure-aluminum was treated under the same conditions as in Example 1. The flame spraying was carried out under the same conditions as in Example 1. FIG. 1 shows the microscopic structure of the surface of the flame-sprayed layer without etching. FIG. 2 shows the microscopic structure of the surface of the flame-sprayed layer with etching by Grad liquid (5 g of ferric chloride, 100 cc of hydrochloric acid, and 100 cc of water). FIG. 3 shows the microscopic structure of the cross-sectional surface of the flame-sprayed layer without etching for 5 seconds. FIG. 4 shows the microscopic structure of the cross-sectional surface of the flame-sprayed layer with etching by Grad liquid. Morphology of the copper-alloy powder is judged as follows. That is, the nodular portion of the copper-alloy powder retains the morphology of atomized powder, while the other portion of the copper alloy crystallizes together with the melted aluminum alloy and is free of the atomized-powder morphology. On the other hand, the aluminum virtually does not retain the powder morphology. With regard to the aluminum-alloy, it is judged as follows. The aluminum-alloy phase provides a matrix where the network or flaky copper-alloy phase crystallizes. The aluminum-alloy is almost completely melted, while a portion of the aluminum-alloy reacts with the melted copper so that a Cu—Al compound (i.e., the second copper-alloy) crystallizes. Hardness of the flame-sprayed layer was Hv 200–260. In addition, the entire composition was 45% of Cu, 27% of Al, 6% of Pb, 16% of Si, and 6% of Sn by weight percentage.

Example 4

The flame-spraying was carried out under the same conditions as in Example 3 except that the atomized copper powder of Example 3 was replaced with a Cu-24 weight % of Pb-4 weight % of Sn alloy atomized powder (60 μm of average particle diameter). The same wear test as in Example 1 was carried out. The results are shown in Table 3. Hardness of the flame-sprayed layer was Hv 90–260. In addition, the entire composition was 42% of Cu, 26% of Al, 13% of Pb, 17% of Si, and 2% of Sn, by weight percentage.

Example 5

The flame-spraying was carried out under the same conditions as in Example 3 except that the atomized copper-alloy powder having 60 μm of average particle-diameter was replaced with the atomized copper powder having 30 μm of average particle-diameter, and further the atomized powder of A2024 aluminum-alloy, into which 20 weight % of Si was added, was used. The same wear test as in Example 1 was carried out. The results are shown in Table 3. Hardness of the flame-sprayed layer was Hv 220–260. In addition, the entire composition was 57% of Cu, 26% of Al, 5% of Pb, 5% of Si, and 6% of Sn by weight percentage.

Example 6

The flame-spraying was carried out under the same conditions as in Example 3 except that the atomized copper-alloy powder of Example 5 (i.e., atomized powder of Cu-10 weight % of Pb-10 weight % of Sn alloy) was replaced with a Cu-24 weight % of Pb-10 weight % of Sn alloy atomized powder (30 μm of average particle diameter). The same wear test as in Example 1 was carried out. The results are shown in Table 3. Hardness of the flame-sprayed layer was Hv 190–240. In addition, the entire composition was 50% of Cu, 32% of Al, 9% of Pb, 7% of Si, and 2% of Sn by weight. percentage.

Comparative Example 1

Only the copper-alloy powder of Example 1 was flame sprayed by the same method as in Example 1. The same wear test as in Example 1 was carried out. The results are shown in Table 3. Hardness of the flame-sprayed layer was Hv 180–210.

Comparative Example 2

Only the aluminum alloy of Example 1 was flame sprayed by the same method as in Example 1. The same wear test as in Example 1 was carried out. The results are shown in Table 3. Hardness of the flame-sprayed layer was Hv 210–230.

Example 7

Figure 5:
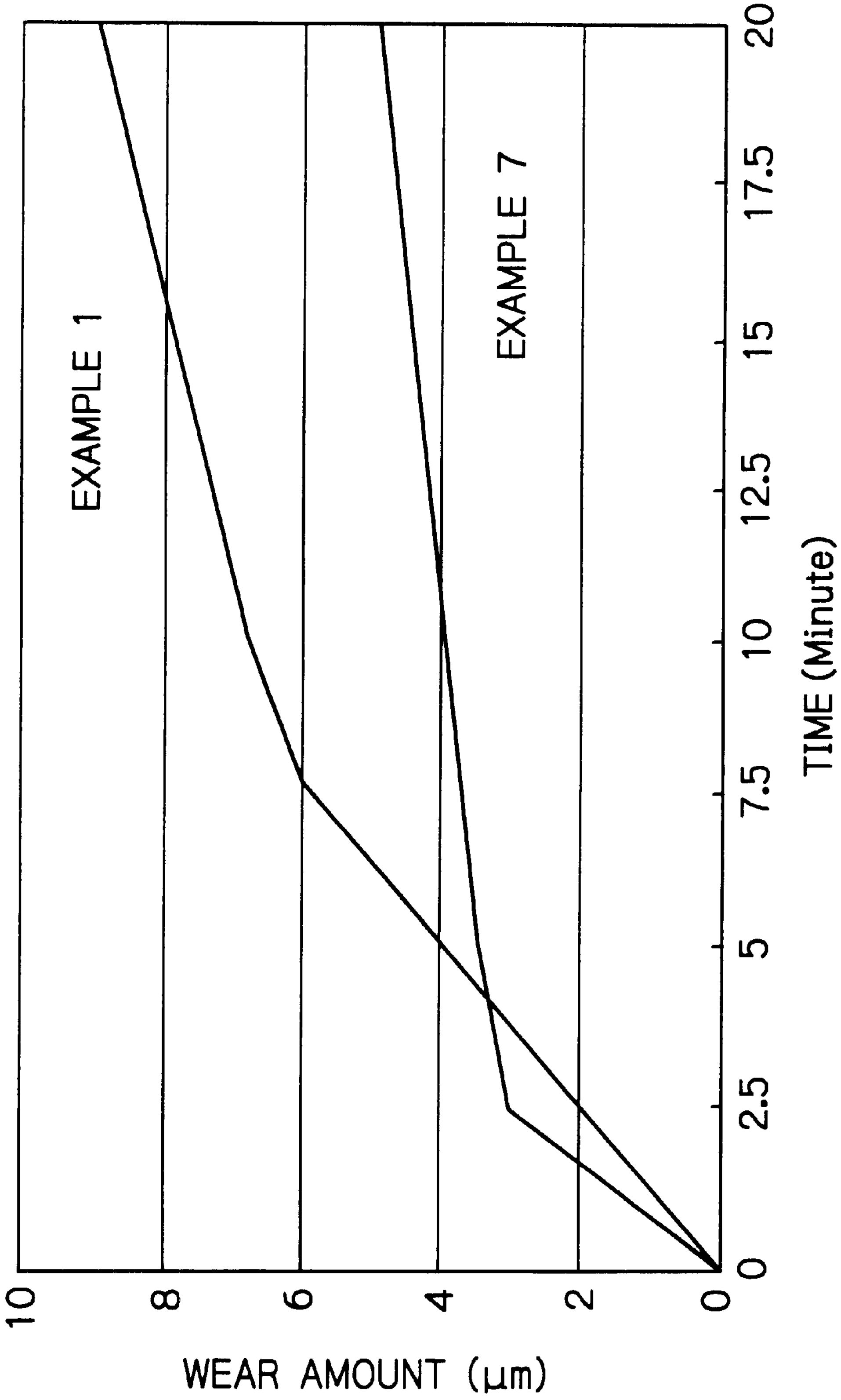
FIG. 5 is a graph showing the results of the wear test of the inventive Example 7.

A 5-μm thick 9.0% Pb-10% Sn plating layer was formed on the flame-sprayed layer of Example 1. This flame-sprayed layer and the flame-sprayed layer of Example 1 were subjected to the wear test by the following method. The test result is shown in FIG. 5. It turns out from the comparison of these examples that the Pb—Sn plating layer retards the speed of increase of the wear amount.

TABLE 3

| | Wear Amount (μm) |
|---|---|
| Example 1 | 9.0 |
| Example 2 | 6.0 |
| Example 3 | 17.0 |
| Example 4 | 15.0 |
| Example 5 | 5.0 |
| Example 6 | 6.0 |
| Example 7 | 5.0 |
| Comparative Example 1 | 40 |
| Comparative Example 2 | 95 |

INDUSTRIAL APPLICABILITY

As is described above, the sliding layer of a swash plate of according to the present invention has a composite structure of copper (alloy) and aluminum (alloy) by flame spraying. The wear resistance of such sliding layer is exceedingly enhanced as compared with that of the sliding layer of aluminum (alloy) or copper (alloy).

What is claimed is:

1. A swash plate of a swash-plate type compressor, characterized in that a flame-sprayed surface layer, which comprises copper or a first copper-alloy having at least unmelted phase, and aluminum or a first aluminum alloy having at least melted phase are formed on at least a surface of the swash plate in sliding contact with a shoe.

2. A swash-plate of a swash-plate type compressor according to claim 1, wherein said first copper alloy comprises a second copper alloy, which is formed by incorporating said aluminum or a component of the first aluminum alloy into the first copper alloy, by flame-spraying.

3. A swash-plate of a swash-plate type compressor according to claim 2, wherein said first aluminum alloy comprises a second aluminum alloy, which is formed by incorporating said copper or a component of the first copper alloy into the first aluminum alloy, by flame-spraying.

4. A swash-plate of a swash-plate type compressor according to claim 2 or 3, characterized in that the main structure consists of the unmelted phase of the copper or the first copper alloy and the melted phase of aluminum or the second aluminum alloy.

5. A swash-plate of a swash-plate type compressor according to claim 4, wherein said flame-sprayed layer comprises at least either of the melted phase of copper or the first copper alloy and the unmelted phase of aluminum or the first aluminum alloy.

6. A swash-plate of a swash-plate type compressor according to claim 1, wherein said first copper alloy comprises Pb, and said first aluminum alloy comprises Si.

7. A swash-plate of a swash-plate type compressor according to claim 6, characterized in that said first copper alloy comprises 40% by weight or less of Pb, and said first aluminum alloy comprises from 12 to 60% by weight of Si.

8. A swash-plate of a swash-plate type compressor according to claim 7, characterized in that said first copper alloy further contains from 0.5 to 50% by weight of one or more selected from the group consisting of 30% by weight or less of Sn, 0.5% by weight or less of P, 15% by weight or less of Al, 10% by weight or less of Ag, 5% by weight or less of Mn, 5% by weight or less of Cr, 20% by weight or less of Ni, and 30% by weight or less of Zn.

9. A swash-plate of a swash-plate type compressor according to claim 7, characterized in that said first aluminum alloy further comprises 30% by weight or less of Sn.

10. A swash-plate of a swash-plate type compressor according to claim 7, characterized in that said first aluminum alloy further comprises at least one element of the group consisting of 7.0% by weight or less of Cu, 5.0% by weight or less of Mg, 1.5% by weight or less of Mn, 1.5% by weight or less of Fe, 8% by weight or less of Cr, and 8.0% by weight or less of Ni.

11. A swash-plate of a swash-plate type compressor according to claim 10, characterized in that said first aluminum alloy further comprises 30% by weight or less of Sn.

12. A swash-plate of a swash-plate type compressor according to claim 8, characterized in that said first aluminum alloy further comprises 30% by weight or less of Sn.

13. A swash-plate of a swash-plate type compressor according to claim 8, characterized in that said first aluminum alloy further comprises at least one element of the group consisting of 7.0% by weight or less of Cu, 5.0% by weight or less of Mg, 1.5% by weight or less of Mn, 1.5% by weight or less of Fe, 8% by weight or less of Cr, and 8.0% by weight or less of Ni.

14. A swash-plate of a swash-plate type compressor according to claim 13, characterized in that said first aluminum alloy further comprises 30% by weight or less of Sn.

15. A swash-plate of a swash-plate type compressor according to claim 7, characterized in that the entire composition is Cu: 8–82% by weight, Al: 5–50% by weight, Pb: 32% by weight or less, and Si: 5–50% by weight.

16. A swash-plate of a swash-plate type compressor according to claim 8, characterized in that the entire composition is Cu: 8–82% by weight, Al: 5–50% by weight, Pb: 32% by weight or less, Si: 5–50% by weight, Sn: 24% by weight or less, P: 0.4% by weight or less, Ag: 8% by weight or less; Mn: 4% by weight or less, Cr: 4% by weight or less, Ni: 16% by weight or less, and Zn: 24% by weight or less.

17. A swash-plate of a swash-plate type compressor according to claim 9, characterized in that the entire composition is Cu: 8–82% by weight, Al: 5–50% by weight, Pb: 32% by weight or less, Si: 5–50% by weight, and Sn: 21% by weight or less.

18. A swash-plate of a swash-plate type compressor according to claim 10, characterized in that the entire composition is Al: 15–50% by weight, Cu: 8–50% by weight, Pb: 32% by weight or less, Si: 5–50% by weight, Mn: 1.2% by weight or less, Cr: 5% by weight or less, Ni: 4% by weight or less, Mg: 4.0% by weight or less, and Fe: 1.2% by weight or less.

19. A swash-plate of a swash-plate type compressor according to claim 11, characterized in that the entire composition is Al: 15–50% by weight, Cu: 8–50% by weight, Pb: 32% by weight or less, Si: 5–50% by weight, Sn: 24% by weight or less, Mn: 1.2% by weight or less; Cr: 5% by weight or less, Ni: 4% by weight or less, Mg: 4.0% by weight or less, and Fe: 1.2% by weight or less.

20. A swash-plate of a swash-plate type compressor according to claim 12, characterized in that the entire composition is Al: 15–50% by weight, Cu: 8–50% by weight, Pb: 32% by weight or less, Si: 5–50% by weight, Sn: 24% by weight or less, P: 0.4% by weight or less, Ag: 8% by weight or less, Mn: 4% by weight or less, Cr: 4% by weight or less, Ni: 16% by weight or less, and Zn: 24% by weight or less.

21. A swash-plate of a swash-plate type compressor according to claim 13, characterized in that the entire composition is Al: 15–50% by weight, Cu: 8–50% by weight, Pb: 32% by weight or less, Si: 5–50% by weight, Sn: 24% by weight or less, P: 0.4% by weight or less, Ag: 8% by weight or less, Mn: 5% by weight or less, Cr: 8% by weight or less, Ni: 20% by weight or less, Zn: 24% by weight or less, Mg: 4.0% by weight or less, and Fe: 1% by weight or less.

22. A swash plate of a swash-plate type compressor according to claim 14, characterized in that the entire composition is Al: 15–50% by weight; Cu: 8–50% by weight; Pb: 32% by weight or less; Si: 5–50% by weight; Sn: 30% by weight or less; P: 0.4% by weight or less; Ag: 8% by weight or less; Ni: 20% by weight or less; Zn: 24% by weight or less; Mg: 4.0% by weight or less; and, Fe: 1% by weight or less.

23. A swash plate of a swash-plate type compressor according to claim 3, wherein at least a portion of said first copper alloy (except for the second copper alloy) consists of Cu crystals, and at least a portion of said first aluminum alloy (except for the second aluminum alloy) consists of Al crystals.

24. A swash plate of a swash-plate type compressor according claim 6 or 7, characterized by further containing 30% by weight or less of graphite particles.

25. A swash plate of a swash-plate type compressor according to any one of claim 1 or 2, characterized by further containing 30% by weight or less of one or more selected from the group consisting of $Al_2O_3$, $SiO_2$, SiC, $ZrO_2$, $Si_3N_4$, BN, AlN, TiN, TiC, $B_4C$, as well as iron-phosphorus, iron-boron, and iron-nitrogen compounds.

26. A swash plate of a swash-plate type compressor according to claim 1, wherein it is laminated on a substrate and is coated with a soft metal layer.

27. A swash plate of a swash-plate type compressor according to claim 26, wherein said soft metal layer is a plating layer of Pb, Pb alloy, Sn or Sn alloy.

28. A swash plate of a swash-plate type compressor according to claim 26, wherein said soft metal layer is a plating layer mainly consisting of Pb and Sn.

29. A swash plate of a swash-plate type compressor according to claim 2 or 3, characterized in that said flame-sprayed layer is coated with a film, which comprises $MoS_2$ or graphite or a mixture of $MoS_2$ and graphite.

* * * * *